(12) United States Patent
Tawa et al.

(10) Patent No.: US 6,930,975 B2
(45) Date of Patent: Aug. 16, 2005

(54) OPTICAL IRRADIATION HEAD AND INFORMATION RECORDING/ REPRODUCING DEVICE

(75) Inventors: Fumihiro Tawa, Kawasaki (JP); Shinya Hasegawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 384 days.

(21) Appl. No.: 10/356,869

(22) Filed: Feb. 3, 2003

(65) Prior Publication Data

US 2004/0001421 A1 Jan. 1, 2004

(30) Foreign Application Priority Data

Jun. 27, 2002 (JP) .................................... 2002-188579

(51) Int. Cl.⁷ .............................................. G11B 7/135
(52) U.S. Cl. .............................. 369/112.28; 369/112.09
(58) Field of Search ........................... 369/13.33, 13.05, 369/112.09, 112.14, 112.28; 359/831, 833, 834

(56) References Cited

U.S. PATENT DOCUMENTS

| 5,253,086 | A | * | 10/1993 | Lungershausen et al. ...... 359/10 |
| 5,555,329 | A | * | 9/1996 | Kuper et al. ................... 385/36 |
| 5,689,480 | A | | 11/1997 | Kino ............................ 369/14 |
| 6,166,372 | A | | 12/2000 | Yamamoto et al. |
| 2003/0057387 | A1 | * | 3/2003 | Hiroaki ....................... 250/586 |

FOREIGN PATENT DOCUMENTS

| JP | 09-184930 | 7/1997 |
| JP | 2000-187877 | 7/2000 |
| JP | 2000-193580 | 7/2000 |
| JP | 2000-195002 | 7/2000 |

OTHER PUBLICATIONS

Yatsui et al., "Plasmon Waveguide for Optical Far/Near-Field Conversion," Applied Physics Letters, vol. 79, No. 27, Dec. 31, 2001, pp. 4583–4585.

Kim et al., "Fabrication of Micro-Pyramidal Probe Array with Aperture for Near-Field Optical Memory Applications," Japanese Journal of Applied Physics, vol. 39, (2000), pp. 1538–1541.

Increasing throughput of a near-field optical fiber probe over 1000 times by the use of a triple-tapered structure, Applied Physics Letters, vol. 73, No. 15, pp. 2090–2092 (Oct. 12, 1998).

Fabrication of a Near-Field Optical Fiber Probe with a Nanometric Metallized Protrusion, Optical Review, vol. 5, No. 6, pp. 369–373 (1998).

* cited by examiner

*Primary Examiner*—W. R. Young
*Assistant Examiner*—Lixi Chow
(74) *Attorney, Agent, or Firm*—Greer, Burns & Crain, Ltd.

(57) ABSTRACT

An optical irradiation head including a trapezoidal prism having a pair of trapezoidal principal surfaces parallel to each other, a rectangular bottom surface, a rectangular top surface parallel to the rectangular bottom surface, and a pair of oblique side surfaces connecting the top surface, the bottom surface, and the principal surfaces, and a cover member for covering the principal surfaces and the oblique side surfaces. The trapezoidal prism is formed of a first material, and the cover member is formed of a second material. Linearly polarized light having a polarization direction perpendicular to the principal surfaces is incident on the bottom surface. For example, the first material is a dielectric transparent to the incident light, and the second material is metal such as Al, Au, or Ag.

25 Claims, 12 Drawing Sheets

OPTICAL IRRADIATION HEAD AND INFORMATION RECORDING/REPRODUCING DEVICE

BACKGROUND OF THE INVENTION

1. Field of the Invention

The present invention relates to an optical irradiation head and an information recording/reproducing device using the optical irradiation head.

2. Description of the Related Art

With the progress of information society, the quantity of information is increasing more and more. In response to such an increase in the quantity of information, there is a demand for a very high-density information recording method and a recording/reproducing device based on this method. As a recording method for realization of high-density recording, attention is being given to a near-field optical recording method such that a microscopic aperture smaller than the wavelength of incident light is formed and near-field light generated from this aperture is used to form a beam spot smaller than the wavelength of incident light.

For example, Japanese Patent Laid-open No. Hei 10-206660 discloses an aperture formed at a sharpened end of an optical fiber as the microscopic aperture in the near-field optical recording method. That is, an optical fiber having a sharpened end is covered with a metal film, and the sharpened end with the metal film is partially cut off by a particle beam such as a focused ion beam (FIB) to thereby form the aperture.

As another conventional technique, a method of forming an aperture having inclined surfaces through a flat plate is disclosed in U.S. Pat. No. 5,689,480. In this method, an Si substrate is patterned by a lithography technique, and the pattern is anisotropically etched to form an inverted pyramidal recess so that the apex of the inverted pyramid as the deepest point of the recess in the substrate is exposed to the back surface of the substrate. The exposure of the deepest point of the recess in the substrate may be effected by any known method such as polishing of the back surface of the Si substrate or etching. Further, a method of improving the efficiency of light propagation by depositing metal on the tip of a pointed core of an optical fiber is disclosed in Opt. Rev., Vol. 5, No. 6 (1998) 369–373. Further, the shape of an optical fiber for improving both the beam spot size and the light propagation efficiency is disclosed in Appl. Phys. Lett., Vol. 173, No. 15.

In the conventional method of forming the microscopic aperture by sharpening the end of an optical fiber, deposition for forming the metal film is not uniform, and there is a problem of instability of an etching rate due to the concentration of an etching solution or the material composition of the optical fiber. Further, there are problems in mass production process such as instability of formation of the apex angle of the conically sharpened end of the optical fiber and difficulty of control of cutting of the sharpened end by FIB. Further, it is difficult to form a multihead because of the use of an optical fiber.

On the other hand, the conventional method of forming the microscopic aperture by etching the semiconductor substrate has various problems in fabrication process such as instability of an etching rate to an aperture size of tens of nanometers, instability of an aperture size due to nonuniformity of the thickness of the Si substrate in relation to a constant etching amount, and instability of the shape of an etching portion due to deviation of crystal orientation in cutting of the semiconductor substrate. Further, since the inverted pyramidal shape is determined by the crystal orientation inherent in the semiconductor substrate, the angle of the inverted pyramid cannot be controlled to a desired optimum angle in some case. Further, the consumption of the materials used in the process is increased because of many steps of separation and dissolution of the substrate, causing an increase in cost.

At the microscopic aperture smaller than the wavelength of incident light, a plasmon is produced along the aperture edge perpendicular to the polarization direction of the incident light, and the plasmon radiates an electric field as if it were a new light source. As a result, the beam spot size, $1/e^2$, becomes greater than the aperture size, and the beam spot size increases with an increase in distance from the aperture. Moreover, the conventional near-field optical irradiation head cannot be applied to a system of reading information by a magnetic sensor head such as an optically assisted (thermally assisted) magnetic recording system supporting high-density recording.

In a conventional manufacturing method, the near-field optical irradiation head and the magnetic sensor head must be individually manufactured, and the alignment of these heads is required. In particular, the alignment accuracy between the microscopic aperture and the magnetic sensor head must be set to a track pitch or less. The track pitch in high-density recording will become 0.1 μm or less in the future. However, it is difficult to align the near-field optical irradiation head and the magnetic sensor head with such a high accuracy.

In the conventional technique for improving the light propagation efficiency by using an optical fiber, the electric field of the incident light is concentrated at a certain position by a lens effect on a conical surface inside the optical fiber according to the conical shape of the tip surrounded by the deposited metal. In Appl. Phys. Lett., Vol. 173, No. 15, an aperture surface is located on the plane where the electric field is concentrated, so as to reduce the beam spot size and improve the propagation efficiency. This method is effective, but a very high working accuracy is required, so that there is a problem in working process as similar to the above.

SUMMARY OF THE INVENTION

It is therefore an object of the present invention to provide an optical irradiation head which can achieve high mass productivity, high reproducibility of aperture size, and high efficiency of light propagation.

It is another object of the present invention to provide an information recording/reproducing device which can achieve high-density recording by using the optical irradiation head.

In accordance with an aspect of the present invention, there is provided an optical irradiation head including a trapezoidal prism having a pair of trapezoidal principal surfaces parallel to each other, a rectangular bottom surface, a rectangular top surface parallel to the rectangular bottom surface, and a pair of oblique side surfaces connecting the rectangular top surface, the rectangular bottom surface, and the trapezoidal principal surfaces, the trapezoidal prism being formed of a first material; and a cover member for covering the trapezoidal principal surfaces and the oblique side surfaces of the trapezoidal prism, the cover member being formed of a second material; the first and second materials being related so as to satisfy $n_1^2 - k_1^2 > 0$, $k_1 < 0.01$, and $n_2^2 - k_2^2 < 0$ where $n_1$ and $n_2$ are the refractive indices of the first and second materials, respectively, $k_1$ and $k_2$ are the extinction coefficients of the first and second materials, respectively, and $n_1-j \cdot k_1$ and $n_2-j \cdot k_2$ ($j^2=-1$) are the complex indices of refraction of the first and second materials, respectively.

The optical irradiation head further includes means for making incident on the rectangular bottom surface linearly polarized light having a polarization direction perpendicular to the trapezoidal principal surfaces. Preferably, the trapezoidal prism is formed of a dielectric such as diamond transparent to incident light such as diamond, $TiO_2$ and ZnS, and the cover member is formed of metal such as Al, Au, or Ag. The rectangular top surface is formed at a position where the electric field intensity of the light incident on the bottom surface is maximized by mode conversion at the oblique side surfaces. Preferably, the oblique side surfaces are inclined at the same angle to the bottom surface and inclined at the same angle to the top surface.

Preferably, the optical irradiation head further includes a dielectric member embedded in the trapezoidal prism so as to extend between the bottom surface and the top surface and be exposed to the top surface at a substantially central portion thereof, the dielectric member having a refractive index smaller than that of the trapezoidal prism, the dielectric member having a polygonal cross section. Alternatively, the dielectric member may be replaced by a metal member capable of exhibiting a similar effect. Preferably, the optical irradiation head further includes a triangular prism formed integrally with the trapezoidal prism from the first material, the triangular prism having a triangular principal surface parallel to the trapezoidal principal surfaces of the trapezoidal prism, a bottom surface flush with the rectangular bottom surface of the trapezoidal prism, and a pair of oblique side surfaces; the cover member further covering the triangular principal surface and the oblique side surfaces of the triangular prism. Preferably, the cover member has a cutaway portion for partially exposing one of the trapezoidal principal surfaces of the trapezoidal prism; the optical irradiation head further comprising a grating formed on the exposed trapezoidal principal surface at the cutaway portion.

In accordance with another aspect of the present invention, there is provided an optical irradiation head including a trapezoidal prism having a pair of trapezoidal principal surfaces parallel to each other, a rectangular bottom surface, a rectangular top surface parallel to the rectangular bottom surface, and a pair of oblique side surfaces connecting the rectangular top surface, the rectangular bottom surface, and the trapezoidal principal surfaces, the trapezoidal prism being formed of a first material; and a cover member for covering the trapezoidal principal surfaces and the oblique side surfaces of the trapezoidal prism, the cover member being formed of a second material; the first and second materials being related so as to satisfy $k_1<0.01$ and $|n_1^2-k_1^2|<|n_2^2-k_2^2|$ where $n_1$ and $n_2$ are the refractive indices of the first and second materials, respectively, $k_1$ and $k_2$ are the extinction coefficients of the first and second materials, respectively, and $n_1-j \cdot k_1$ and $n_2-j \cdot k_2$ ($j^2=-1$) are the complex indices of refraction of the first and second materials, respectively.

Preferably, the trapezoidal prism is formed of a transparent dielectric such as diamond, and the cover member is formed of a material such as Al having a relative permittivity greater in absolute value than that of the trapezoidal prism.

In accordance with a further aspect of the present invention, there is provided an information recording/reproducing device for recording/reproducing information to/from a recording medium, comprising a light source for emitting an optical beam; and an optical irradiation head for directing light based on the optical beam onto the recording medium; the optical irradiation head comprising a trapezoidal prism having a pair of trapezoidal principal surfaces parallel to each other, a rectangular bottom surface, a rectangular top surface parallel to the rectangular bottom surface, and a pair of oblique side surfaces connecting the rectangular top surface, the rectangular bottom surface, and the trapezoidal principal surfaces, the trapezoidal prism being formed of a first material; and a cover member for covering the trapezoidal principal surfaces and the oblique side surfaces of the trapezoidal prism, the cover member being formed of a second material; the first and second materials being related so as to satisfy $n_1^2-k_1^2>0$, $k_1<0.01$, and $n_2^2-k_2^2<0$ where $n_1$ and $n_2$ are the refractive indices of the first and second materials, respectively, $k_1$ and $k_2$ are the extinction coefficients of the first and second materials, respectively, and $n_1-j \cdot k_1$ and $n_2-j \cdot k_2$ ($j^2=-1$) are the complex indices of refraction of the first and second materials, respectively.

In accordance with a still further aspect of the present invention, there is provided an information recording/reproducing device for recording/reproducing information to/from a recording medium, comprising a light source for emitting an optical beam; and an optical irradiation head for directing light based on the optical beam onto the recording medium; the optical irradiation head comprising a trapezoidal prism having a pair of trapezoidal principal surfaces parallel to each other, a rectangular bottom surface, a rectangular top surface parallel to the rectangular bottom surface, and a pair of oblique side surfaces connecting the rectangular top surface, the rectangular bottom surface, and the trapezoidal principal surfaces, the trapezoidal prism being formed of a first material; and a cover member for covering the trapezoidal principal surfaces and the oblique side surfaces of the trapezoidal prism, the cover member being formed of a second material; the first and second materials being related so as to satisfy $k1<0.01$ and $|n_1^2-k_1^2|<|n_2^2-k_2^2|$ where $n_1$ and $n_2$ are the refractive indices of the first and second materials, respectively, $k_1$ and $k_2$ are the extinction coefficients of the first and second materials, respectively, and $n_1-j \cdot k_1$ and $n_2-j \cdot k_2$ ($j^2=-1$) are the complex indices of refraction of the first and second materials, respectively.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
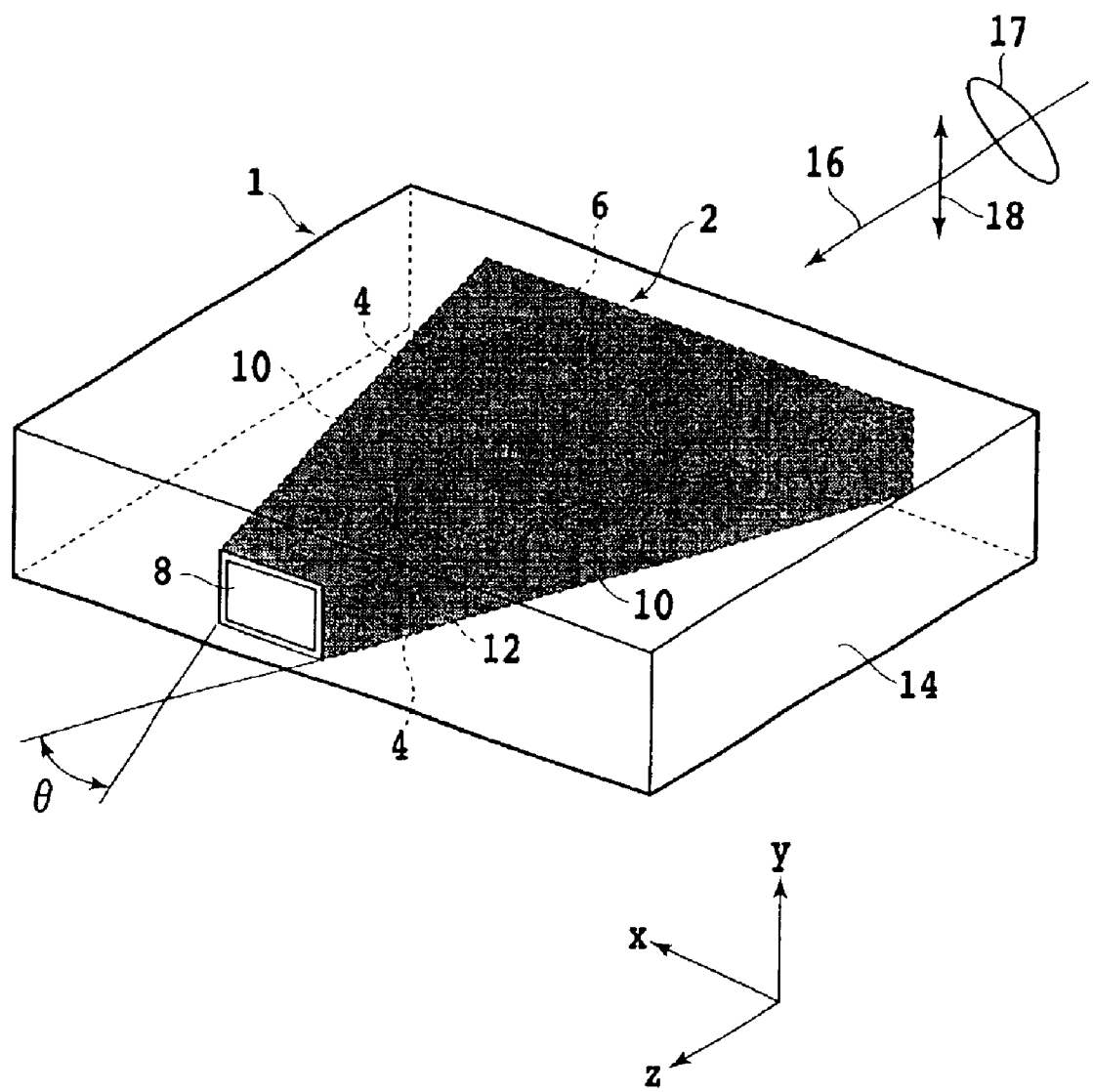
FIG. 1 is a schematic perspective view of an optical irradiation head according to a first preferred embodiment of the present invention.

Referring to FIG. 1, there is shown a schematic perspective view of an optical irradiation head or near-field optical irradiation head according to a first preferred embodiment of the present invention. A trapezoidal prism 2 formed of a dielectric is embedded in a pattern forming substrate 14 such as an Si substrate. The trapezoidal prism 2 has such a shape as obtained by cutting off an apex angular portion of an isosceles triangular prism. That is, the trapezoidal prism 2 has a pair of trapezoidal principal surfaces 4 parallel to each other, a rectangular bottom surface 6, a rectangular top surface 8 parallel to the rectangular bottom surface 6, and a pair of oblique side surfaces 10 connecting the top surface 8, the bottom surface 6, and a pair of principal surfaces 4.

The trapezoidal prism 2 is covered with a coating 12 such as a metal coating except the bottom surface 6 and the top surface 8. The materials of the trapezoidal prism 2 and the coating 12 are so related as to satisfy $n_1^2 - k_1^2 > 0$, $k_1 < 0.01$, and $n_2^2 - k_2^2 < 0$ where $n_1$ and $n_2$ are the refractive indices of the trapezoidal prism 2 and the coating 12, respectively, $k_1$ and $k_2$ are the extinction coefficients of the trapezoidal prism 2 and the coating 12, respectively, and $n_1 - j \cdot k_1$ and $n_2 - j \cdot k_2$ ($j^2 = -1$) are the complex indices of refraction of the trapezoidal prism 2 and the coating 12, respectively. The trapezoidal prism 2 is formed of a transparent dielectric such as diamond, $TiO_2$ and ZnS, and the coating 12 is formed of metal such as Al, Au, or Ag. The trapezoidal prism 2 is covered with the coating 12 having a thickness of tens of nanometers or more except the bottom surface 6 as an incident surface and the top surface 8 as an emergent surface. Preferably, the coating 12 is formed on the trapezoidal prism 2 by evaporation. Alternatively, the coating 12 may be formed from a metallic plate. The higher the refractive index $n_1$ of the trapezoidal prism 2, the more the size of a beam spot obtainable by this optical irradiation head can be reduced.

Linearly polarized light 16 having a polarization direction 18 perpendicular to the principal surfaces 4 of the trapezoidal prism 2 is condensed by a lens 17 or the like to enter the bottom surface 6 of the trapezoidal prism 2. The electric field intensity of the light 16 incident on the bottom surface 6 is maximized near the top surface 8 by the mode conversion at a pair of the oblique side surfaces 10, and the light having a spot size smaller than the wavelength of the incident light 16 in the vacuum is emerged from the top surface 8.

Figure 2A:
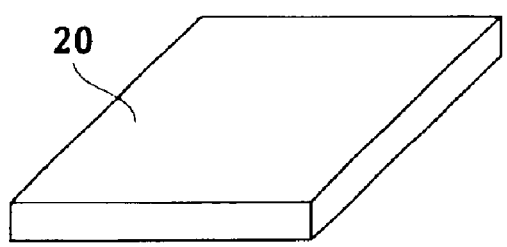
FIGS. 2A to 2H are perspective views showing the steps of a manufacturing method for the optical irradiation head shown in FIG. 1.
Figure 2B:
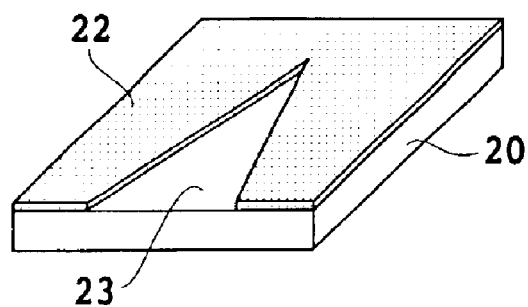
Figure 2C:
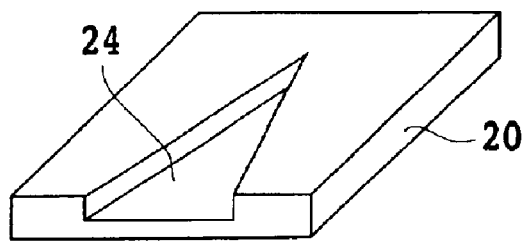

A manufacturing method for the optical irradiation head 1 according to the first preferred embodiment of the present invention will now be described with reference to FIGS. 2A to 2H. As shown in FIG. 2A, an Si substrate 20 having a refractive index n=5.57 and an extinction coefficient k=0.387 for incident light having a wavelength λ=400 nm is prepared. A photoresist 22 is next applied to the Si substrate 20, and subjected to exposure and development with a mask to thereby partially remove the photoresist 22 at a triangular exposed portion 23 as shown in FIG. 2B. The exposed portion 23 is next etched for a predetermined time period, and the remaining photoresist 22 is next removed to thereby form a triangular recess 24 having a predetermined depth at the exposed portion 23 as shown in FIG. 2C.

Figure 2D:
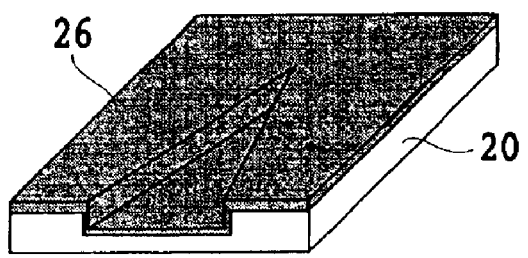
Figure 2E:
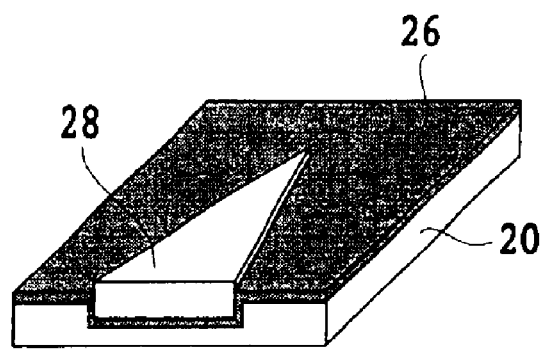
Figure 2F:
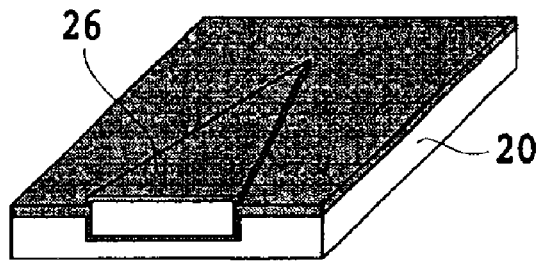

As shown in FIG. 2D, a gold film 26 having a refractive index n=1.658 and an extinction coefficient k=1.956 for incident light having a wavelength λ=400 nm is next deposited on the Si substrate 20 so as to obtain a film thickness of about 30 nm by evaporation. As shown in FIG. 2E, diamond 28 is next grown within the recess 24 from a material such as methanol or ethylene gas by plasma CVD or ion beam deposition, for example, so as to obtain a predetermined thickness. As shown in FIG. 2F, the gold film 26 is similarly deposited on the upper surface of the diamond 28 so as to obtain a film thickness of about 30 nm by evaporation.

Figure 2G:
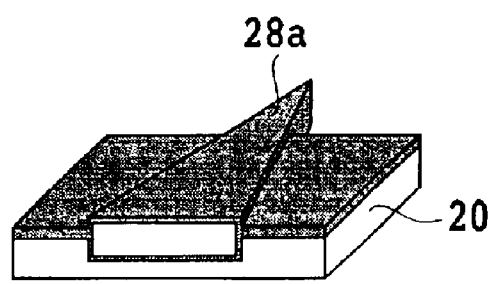
Figure 2H:
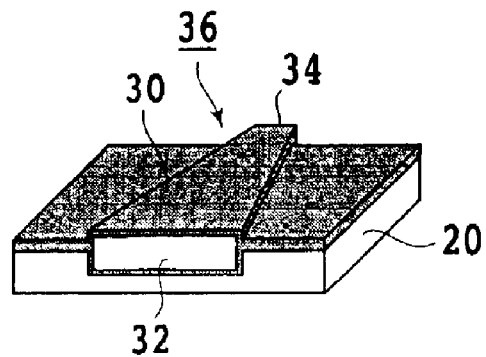

The reason for selection of the diamond 28 is that this material is transparent and has a high refractive index and that it is adapted to light having a wavelength of 400 nm. In the case of using light having a wavelength of 680 nm, gallium phosphide (GaP) is an adaptable material. As shown in FIG. 2G, the substrate 20 is next broken so as to expose an apex angular portion 28a of the diamond triangular prism 28. As shown in FIG. 2H, the apex angular portion 28a is finally cut off by FIB, for example, thus completing an optical irradiation head 36 including a trapezoidal prism 30 having a rectangular bottom surface 32 and a rectangular top surface 34 wherein the diamond 28 is exposed to the bottom surface 32 and the top surface 34.

According to the above manufacturing method, the optical irradiation head can be fabricated with a two-dimensional pattern on the pattern forming substrate 14, so that a lithography technique as in fabrication of a semiconductor circuit can be used. Accordingly, a wasteful use of material by etching can be suppressed and high-precision arrangement and multilayer formation of the head can be achieved. That is, since a two-dimensional pattern having only a parameter along the depth is used, the optical irradiation head according to this preferred embodiment is not limited by the crystal orientation of the substrate unlike the conventional inverted pyramidal optical irradiation head using an Si substrate, so that any substrate other than an Si substrate can therefore be used and the apex angle of the triangular prism to be cut into the trapezoidal prism 2 can be freely set.

Figure 3:
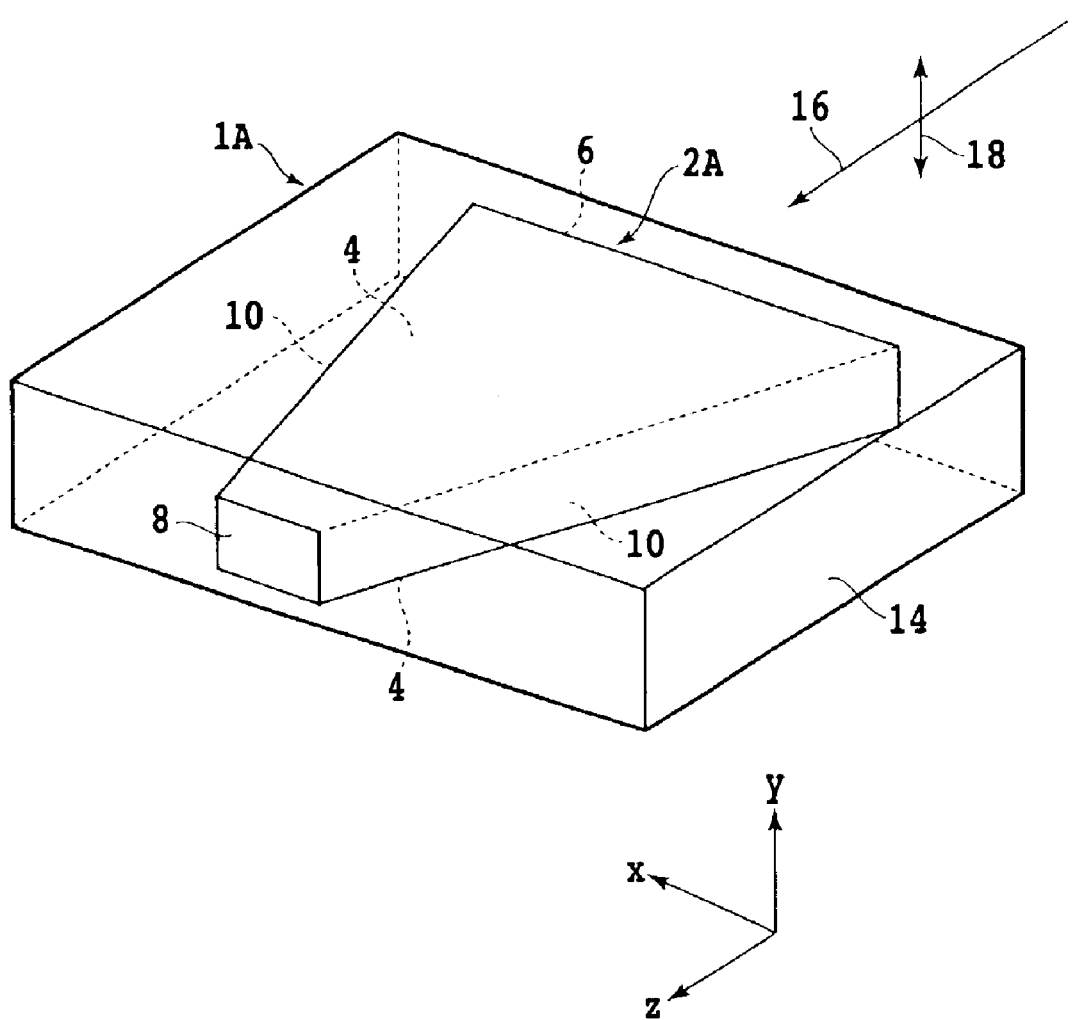
FIG. 3 is a schematic perspective view of an optical irradiation head according to a second preferred embodiment of the present invention.

FIG. 3 is a schematic perspective view of an optical irradiation head 1A according to a second preferred embodiment of the present invention. Substantially the same parts as those of the optical irradiation head 1 according to the first preferred embodiment are denoted by the same reference numerals. A trapezoidal prism 2A is covered with a pattern forming substrate 14 formed of a dielectric except a rectangular bottom surface 6 as an incident surface and a rectangular surface 8 as an emergent surface. The trapezoidal prism 2A is formed of a transparent first dielectric such as diamond, and the substrate 14 covering the trapezoidal prism 2A is formed of a second dielectric such as Si having a relative permittivity greater in absolute value than that of the trapezoidal prism 2A.

In general, the first and second dielectrics are so related as to satisfy $k_1 < 0.01$ and $|n_1^2 - k_1^2| < |n_2^2 - k_2^2|$ where $n_1$ and $n_2$ are the refractive indices of the first and second dielectrics, respectively, $k_1$ and $k_2$ are the extinction coefficients of the first and second dielectrics, respectively, and $n_1 - j \cdot k_1$ and $n_2 - j \cdot k_2$ ($j^2 = -1$) are the complex indices of refraction of the first and second dielectrics, respectively. As in the first preferred embodiment, linearly polarized light 16 having a polarization direction 18 perpendicular to a pair of trapezoidal principal surfaces 4 of the trapezoidal prism 2A is condensed by a lens or the like to enter the bottom surface 6 of the trapezoidal prism 2A.

According to this preferred embodiment, an Si substrate is used as the pattern forming substrate 14, and the trapezoidal prism 2A of diamond is directly covered with this Si substrate without the use of a metal coating. Also with this configuration, the size of a beam spot of emergent light from the top surface 8 can be reduced to an extent similar to that in the case of covering the trapezoidal prism 2A with a metal coating such as a gold coating. Further, the dielectric trapezoidal prism 2A can be formed directly on the Si substrate 14 without the need for a deposition step for a metal coating, so that the optical irradiation head 1A can be manufactured more easily than the optical irradiation head 1 of the first preferred embodiment.

Figure 4A:
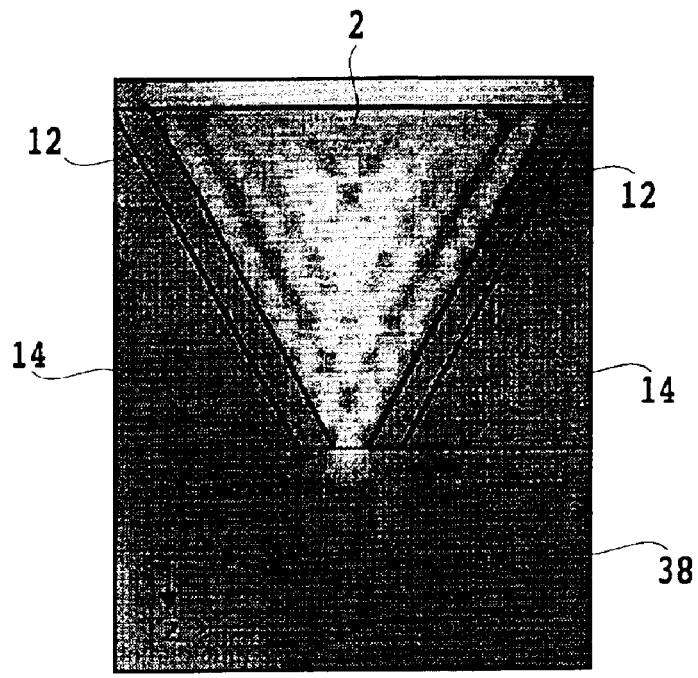
FIG. 4A is a plan view showing a simulated electric field intensity inside a dielectric as viewed in the XZ plane.
Figure 4B:
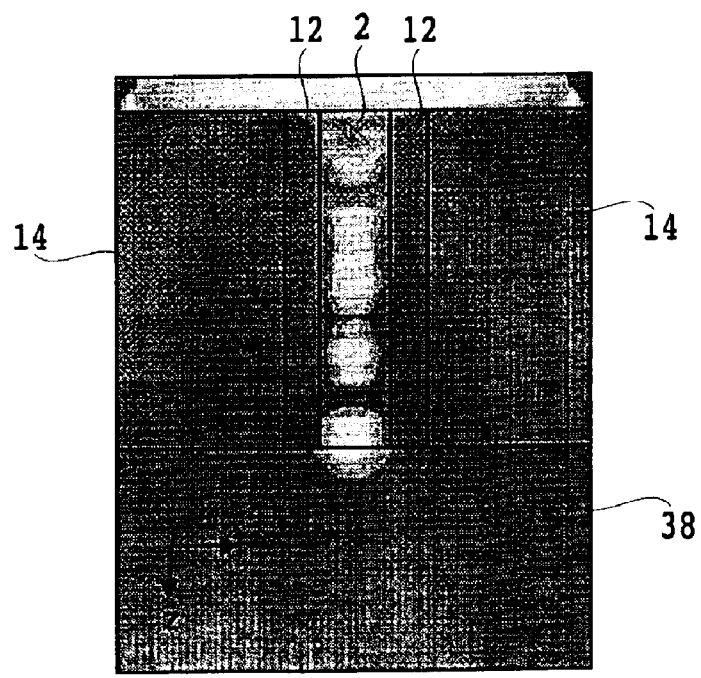
FIG. 4B is a view similar to FIG. 4A, as viewed in the YZ plane.

FIGS. 4A and 4B are plan and side views showing a simulated electric field intensity inside the dielectric forming the trapezoidal prism 2 shown in FIG. 1, respectively. More specifically, FIG. 4A shows a simulated electric field intensity inside the dielectric as viewed in the XZ plane in FIG. 1, and FIG. 4B shows the simulated electric field intensity as viewed in the YZ plane in FIG. 1. As shown in FIGS. 4A and 4B, the dielectric trapezoidal prism 2 is covered with the metal coating 12 except the bottom surface 6 and the top surface 8. Reference numerals 14 and 38 denote a pattern forming substrate and a free space, respectively. In this simulation, the trapezoidal prism 2 is formed of diamond, and the dimensions are such that the apex angle is 60 degrees, the length of the top side is 0.23 $\mu$m, the length of the bottom side is 2 $\mu$m, and the thickness is 0.4 $\mu$m. The wavelength of incident light on the bottom surface 6 is 400 nm.

When linearly polarized light enters the bottom surface 6 of the trapezoidal prism 2 of the optical irradiation head 1 sown in FIG. 1, the light is reflected on the interface between the dielectric trapezoidal prism 2 and the metal coating 12, and the mode conversion of an electric field occurs inside the dielectric as shown in FIGS. 4A and 4B, so that the intensity of the electric field becomes maximum near the top surface 8 of the trapezoidal prism 2. By arranging an aperture for emergence of light at such a position where the electric field intensity becomes maximum, the size of a beam spot of emergent light from the trapezoidal prism 2 can be reduced. In this simulation model, a beam spot having a size of (x, y)=(0.14 $\mu$m, 0.37 $\mu$m) was obtained.

Figure 5A:
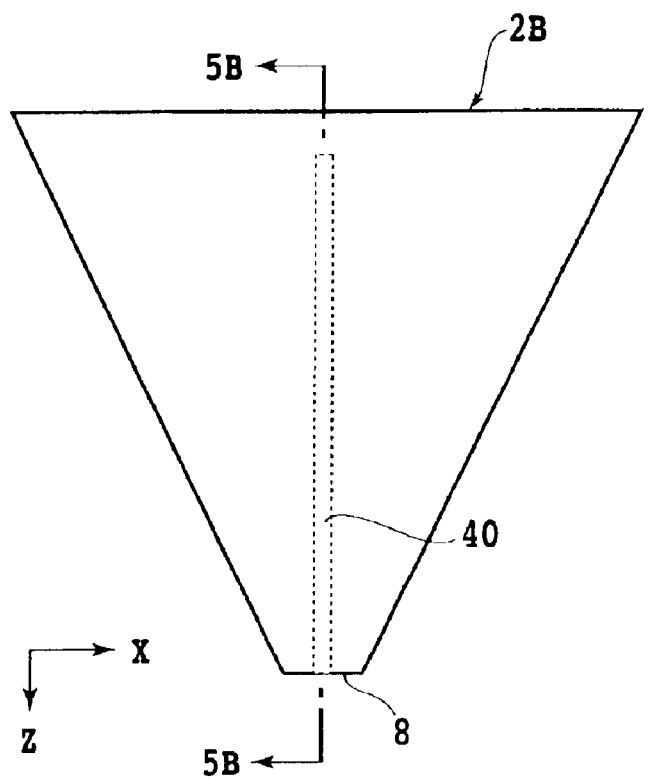
FIG. 5A is a plan view of a trapezoidal prism of an optical irradiation head according to a third preferred embodiment of the present invention.
Figure 5B:
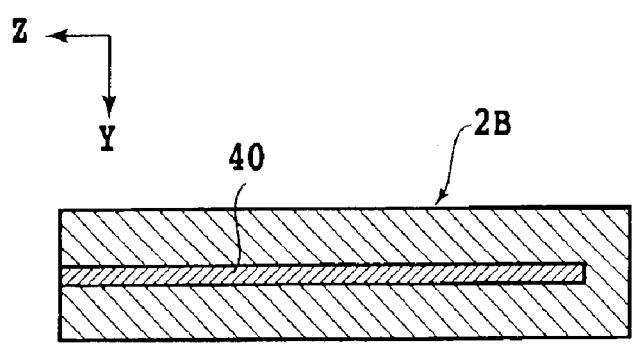
FIG. 5B is a cross section taken along the line 5B—5B in FIG. 5A.

FIGS. 5A and 5B show a trapezoidal prism 2B of an optical irradiation head according to a third preferred embodiment of the present invention. FIG. 5A is a plan view of the trapezoidal prism 2B, and FIG. 5B is a cross section taken along the line 5B—5B in FIG. 5A. In this preferred embodiment, a dielectric core 40 having a polygonal cross section is embedded in the trapezoidal prism 2B formed of a dielectric such as diamond so as to extend between the bottom surface 6 and the top surface 8 (in the Z direction) and be exposed to the top surface 8 as an emergent surface. The dielectric core 40 has a refractive index lower than that of the dielectric trapezoidal prism 2B, so as to reduce the spot size of emergent light as compared with the optical irradiation heads of the first and second preferred embodiments.

The optical irradiation head having such a structure may be manufactured by modifying the step of FIG. 2E. More specifically, the growth of the diamond 28 in the step of FIG. 2E is once stopped at the half of the required thickness. Thereafter, a strip pattern having a width of 60 nm, for example, is formed on the upper surface of the diamond 28 by a lithography technique, and an SiO$_2$ layer having a refractive index n=1.567 and an extinction coefficient k=0 for incident light having a wavelength $\lambda$=400 nm is next formed inside the strip pattern so as to obtain a thickness of about 10 nm. Thereafter, the growth of the diamond 28 is restarted to obtain the remaining half of the required thickness. According to such a manufacturing method, it is possible to fabricate an optical irradiation head having a structure that the SiO$_2$ core 40 having a rectangular cross section is embedded in the diamond trapezoidal prism 2B.

The core (dielectric member) 40 is formed of a material having a refractive index lower than that of the dielectric forming the trapezoidal prism 2B, so that the electric field energy of light propagating in the dielectric forming the trapezoidal prism 2B can be concentrated to thereby reduce the size of a beam spot of emergent light from the end face of the core 40 exposed to the top surface 8 as an emerging aperture. In a simulation model according to this preferred embodiment, a beam spot having a size of 1/e$^2$ of (x, y)=(0.1 $\mu$m, 0.3 $\mu$m) was obtained.

While diamond is used as the dielectric forming the trapezoidal prism 2B, and SiO$_2$ having a refractive index lower than that of diamond is used as the dielectric forming the core 40 in this preferred embodiment, the dielectric forming the core 40 may be replaced by a metal satisfying n$^2$-k$^2$<0 may be adopted. Also in this case, a similar effect can be obtained. As another modification, a recess may be formed on the top surface 8 at its substantially central portion by FIB or the like rather than the formation of the core 40. In this case, air having a refractive index n=1.0 and an extinction coefficient k=0.0 is present in the recess as a dielectric, and a similar effect can be obtained.

Figure 6:
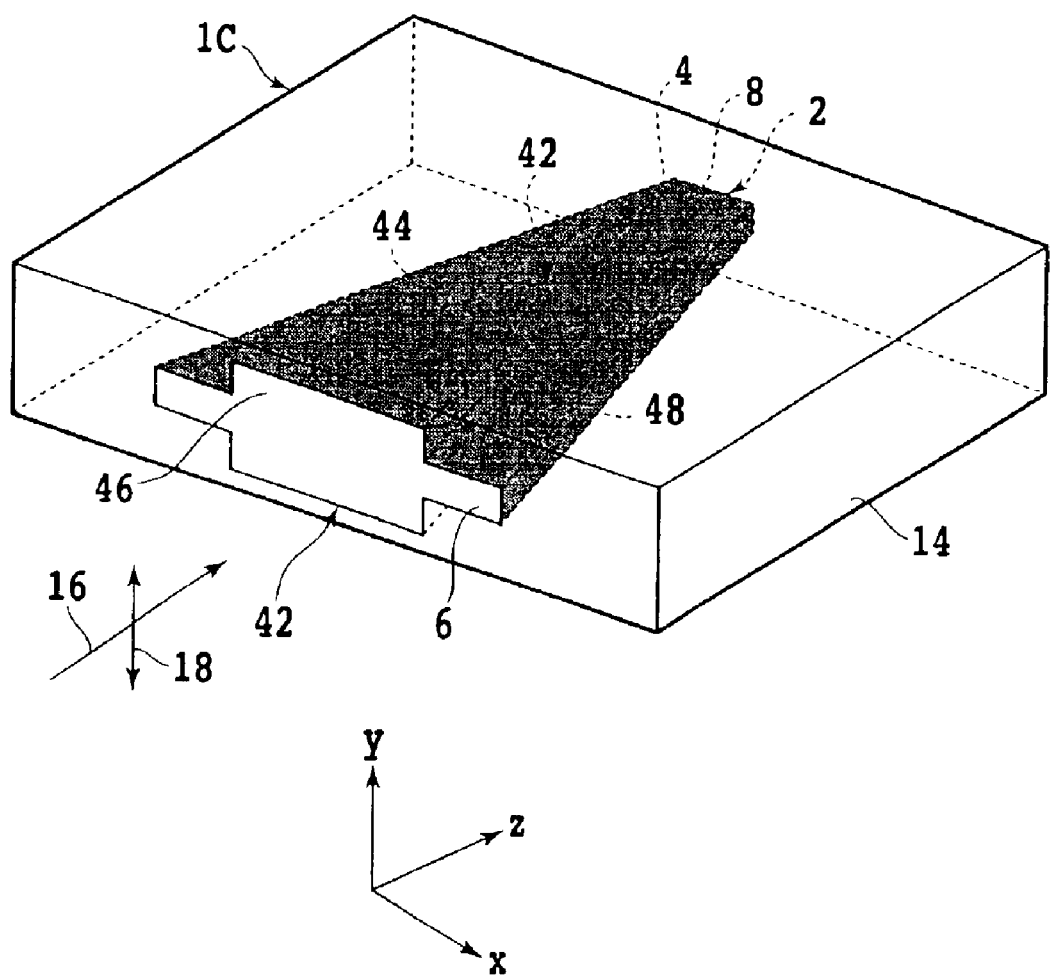
FIG. 6 is a schematic perspective view of an optical irradiation head according to a fourth preferred embodiment of the present invention.

FIG. 6 is a schematic perspective view of an optical irradiation head 1C according to a fourth preferred embodiment of the present invention. In this preferred embodiment, the incident surface of the head has a polygonal shape to improve a coupling efficiency of incident light. In general, the beam spot profile of incident light is an elliptical or circular spot. The incident surface 6 of the trapezoidal prism 1 shown in FIG. 1 has a rectangular shape, wherein the coupling efficiency of incident light having an elliptical or circular beam spot is relatively low.

To cope with this, a pair of triangular prisms 42 are integrally formed on the pair of trapezoidal principal surfaces 4 of the trapezoidal prism 2 as shown in FIG. 6 to increase the area of the incident surface, thereby improving the coupling efficiency of incident light into the trapezoidal prism 2. More specifically, each triangular prism 42 has a triangular principal surface 44 parallel to the trapezoidal principal surfaces 4 of the trapezoidal prism 2, a bottom surface 46 flush with the rectangular bottom surface 6, and a pair of oblique side surfaces 48. Each triangular prism 42 is formed of the same material as that of the trapezoidal prism 2. Preferably, the apex angle of each triangular prism 42 is set to 60 degrees or less. The reason for this setting is that if the apex angle of each triangular prism 42 is greater than 60 degrees, the reflection loss in each triangular prism 42 added to the trapezoidal prism 2 increases. Further, the apex angular portion of each triangular prism 42 is preferably retracted from the emergent top surface 8 of the trapezoidal prism 2.

Figure 7:
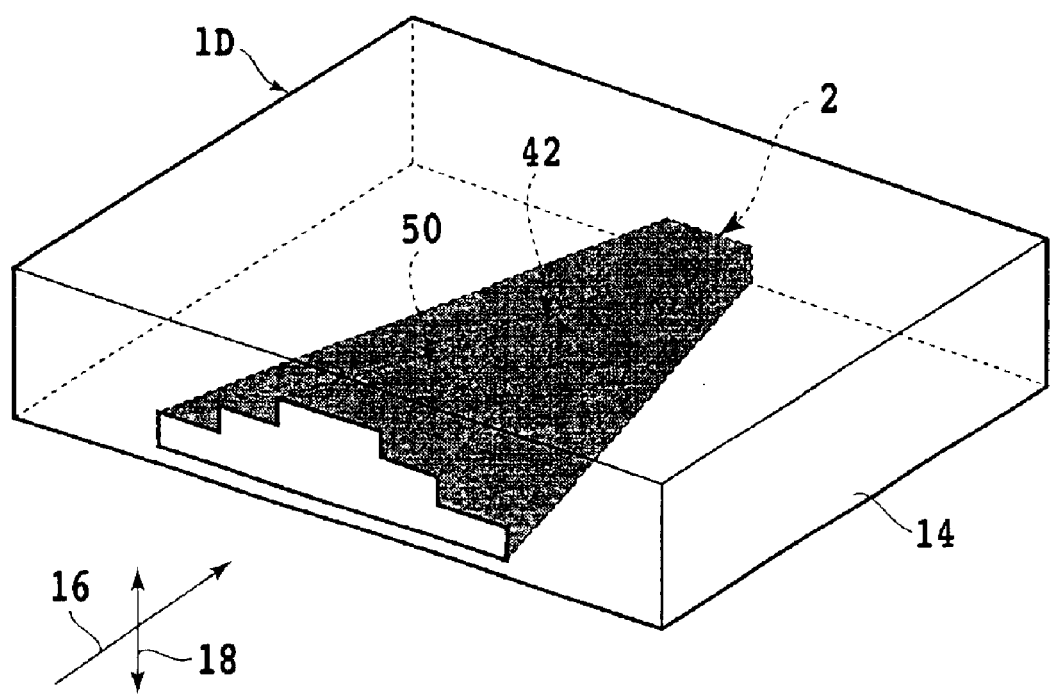
FIG. 7 is a schematic perspective view of an optical irradiation head according to a fifth preferred embodiment of the present invention.

FIG. 7 is a schematic perspective view of an optical irradiation head 1D according to a fifth preferred embodiment of the present invention. In this preferred embodiment, two triangular prisms 42 and 50 different in size are formed on only one of the trapezoidal principal surfaces 4 of the trapezoidal prism 2. As in the fourth preferred embodiment shown in FIG. 6, the coupling efficiency of incident light to the trapezoidal prism 2 can be improved according to the fifth preferred embodiment. While each of the optical irradiation heads according to the preferred embodiments shown in FIGS. 6 and 7 has a three-step structure on the incident surface, the coupling efficiency of incident light can be further improved by increasing the number of steps in the shape of the incident surface.

Figure 8:
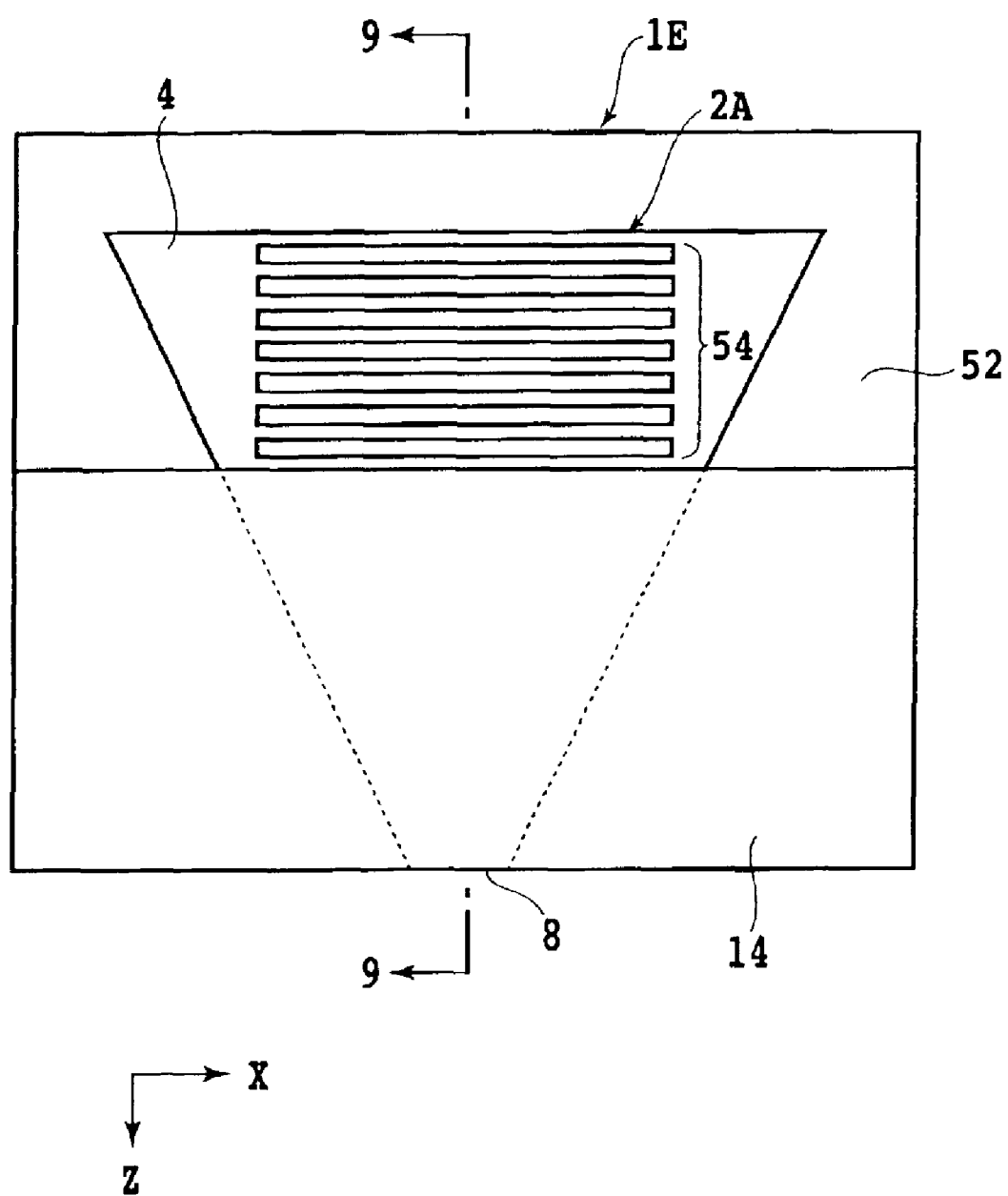
FIG. 8 is a plan view of an optical irradiation head according to a sixth preferred embodiment of the present invention.
Figure 9:
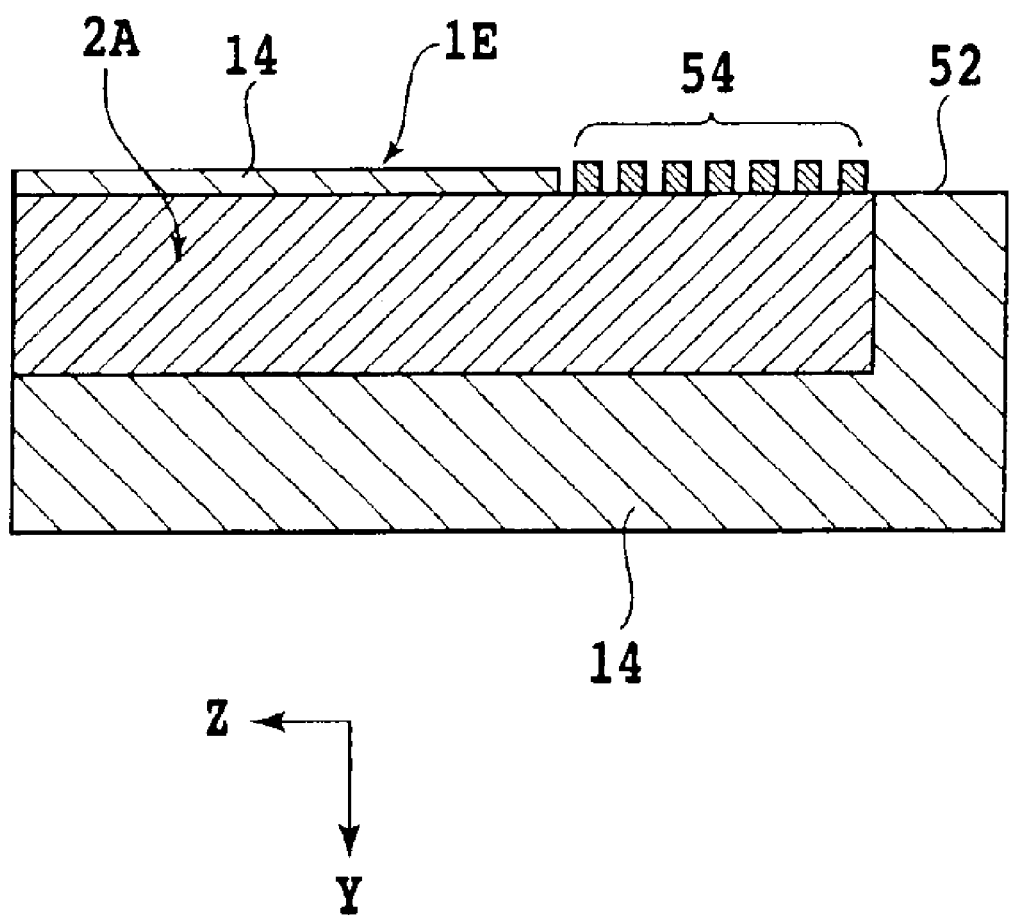
FIG. 9 is a cross section taken along the line 9—9 in FIG. 8.

FIG. 8 is a plan view of an optical irradiation head 1E according to a sixth preferred embodiment of the present invention, and FIG. 9 is a cross section taken along the line 9—9 in FIG. 8. In this preferred embodiment, the substrate 14 as a cover member covering the trapezoidal prism 2A is partially cut away at a portion 52 where the upper principal surface 4 of the trapezoidal prism 2A is partially exposed. Further, a grating 54 is formed on the exposed upper principal surface 4 of the trapezoidal prism 2A at the cutaway portion 52. Incident light is condensed by a lens or the like to enter the cutaway portion 52 where the grating 54 is formed. The light having entered the cutaway portion 52 is scattered by the grating 54 to propagate in the dielectric forming the trapezoidal prism 2A. The mode conversion of an electric field occurs in the dielectric, and the electric field intensity becomes maximum near the top surface 8 of the trapezoidal prism 2A. Then, the light having a reduced beam spot size is emerged from the top surface 8 of the trapezoidal prism 2A.

The grating 54 may be formed of the same dielectric as that of the trapezoidal prism 2A or may be formed of UV curable resin or the like. In forming a metal coating or a dielectric coating having a low refractive index on the dielectric forming the trapezoidal prism 2A, the cutaway portion 52 where the grating 54 is formed must be masked so that the metal coating or the dielectric coating does not cover the cutaway portion 52.

Figure 10:
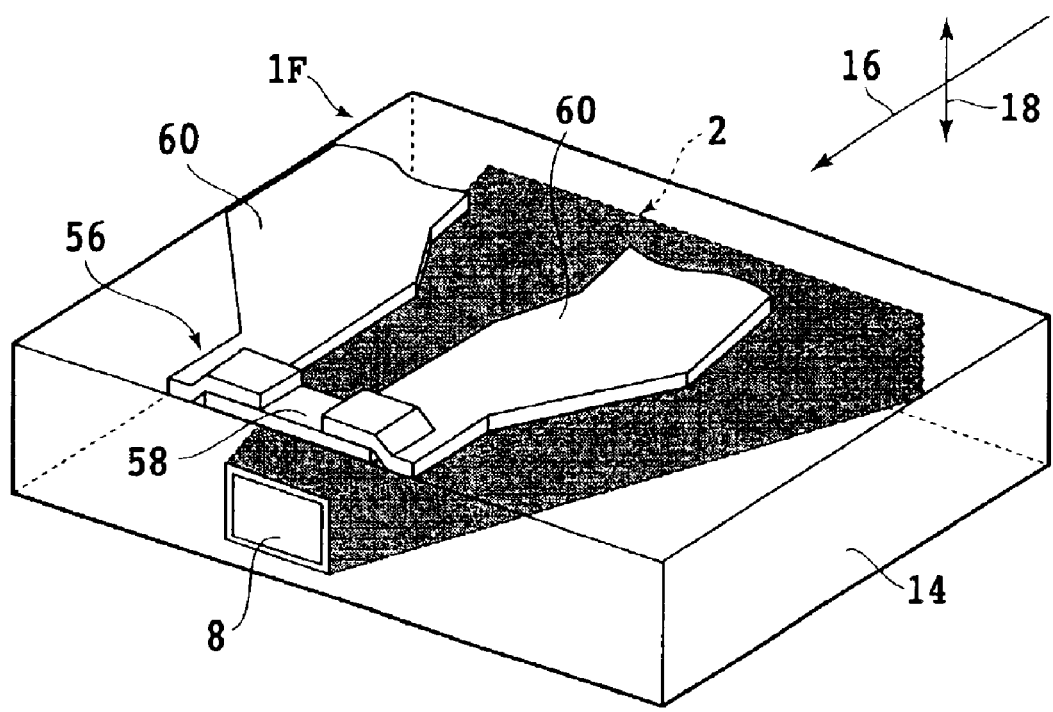
FIG. 10 is a schematic perspective view of a composite head according to a seventh preferred embodiment of the present invention.

FIG. 10 is a schematic perspective view of a composite head according to a seventh preferred embodiment of the present invention. In this preferred embodiment, the composite head includes an optical irradiation head 1F and a magnetic sensor head 56 such as a giant magnetoresistive (GMR) head formed on the optical irradiation head 1F. The magnetic sensor head 56 includes a spin valve GMR film 58 and a pair of terminals 60. The optical irradiation head 1F is planar in the XZ plane, so that the magnetic sensor head 56 can be fabricated on the XZ plane by a lithography technique in series with the fabrication of the optical irradiation head 1F. In this manner, the optical irradiation head 1F and the magnetic sensor head 56 can be fabricated by the same lithography technique, thereby allowing high-precision alignment of the optical irradiation head 1F and the magnetic sensor head 56.

Figure 11:
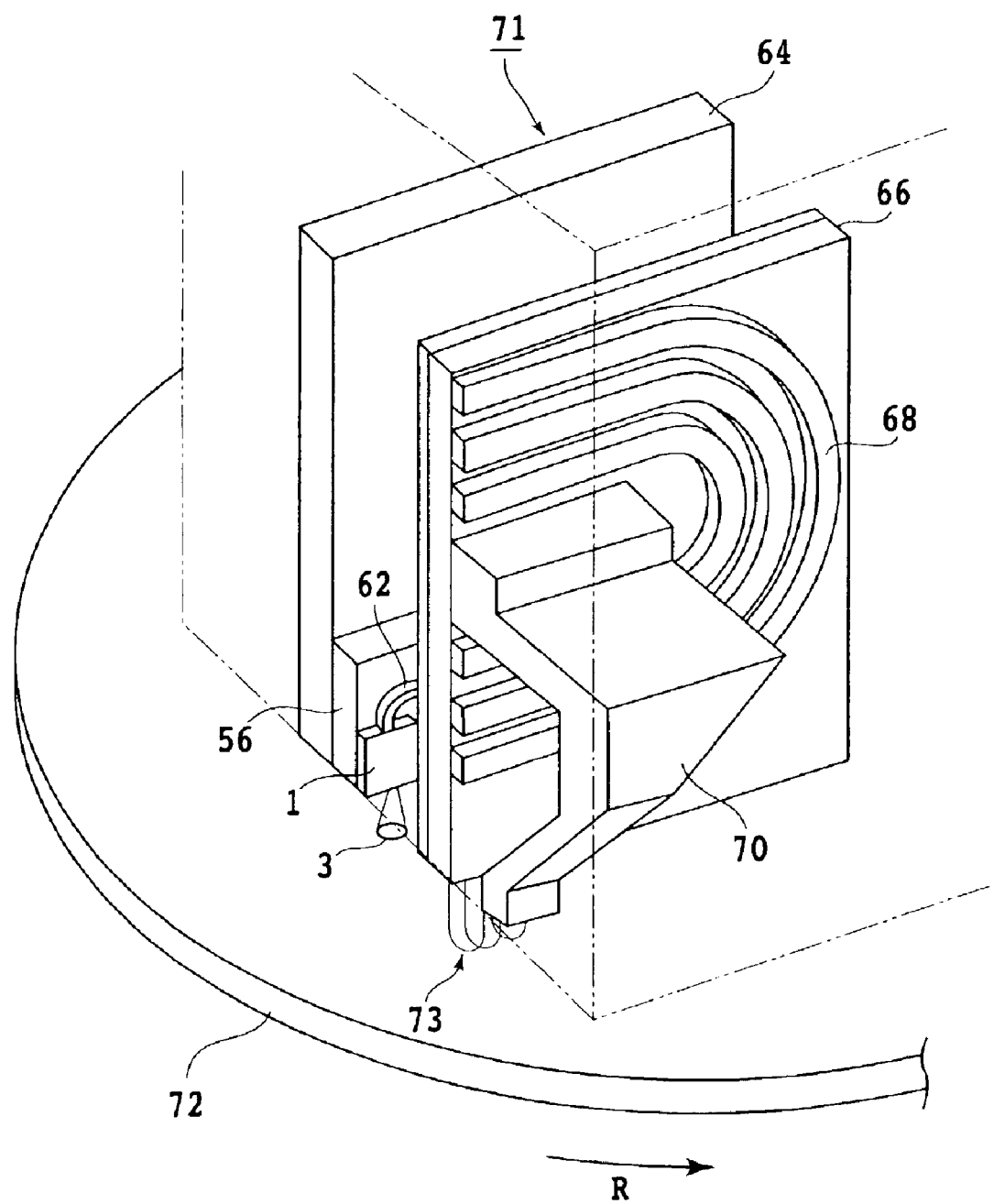
FIG. 11 is a schematic perspective view of an information recording/reproducing device using the optical irradiation head according to the present invention.

Referring to FIG. 11, there is shown a schematic perspective view of an information recording/reproducing device 71 using the optical irradiation head of the present invention. The information recording/reproducing device 71 is an optically assisted magnetic recording/reproducing device. A magnetic recording medium 72 is rotated in the direction shown by an arrow R. A magnetic sensor head 56 for reproduction and an optical irradiation head 1 according to the present invention are formed between a lower magnetic shield 64 and an upper magnetic shield 66 serving also as a lower core. Incident light is guided through an optical waveguide 62 into the optical irradiation head 1. A coil 68 for information writing is formed on the lower core 66. Reference numeral 70 denotes an upper core.

In the formation recording/reproducing device 71 according to this preferred embodiment, a mark recorded on the magnetic recording medium 72 is passed along the magnetic sensor head 56, the optical irradiation head 1, and the coil 68 in this order by the rotation of the magnetic recording medium 72. In writing information on the magnetic recording medium 72, light 3 emerged from the optical irradiation head 1 is directed onto the magnetic recording medium 72 to heat the medium 72, and a magnetic field 73 generated from the coil 68 is applied to the medium 72 just heated above, thereby writing the information. Accordingly, the information can be written on the medium 72 with a relatively small magnetic field intensity.

While the information recording/reproducing device mentioned above is an optically assisted magnetic recording/reproducing device, the application of the optical irradiation head according to the present invention is not limited to such a device. For example, the optical irradiation head according to the present invention is also applicable to a phase change type optical disk drive and a magneto-optical disk drive, owing to its capability of forming a microscopic beam spot.

According to the present invention as described above, it is possible to manufacture an optical irradiation head which can emerge an optical beam having a reduced spot size similar to that of a conventional optical irradiation head, easily by using a two-dimensional pattern formed on a substrate. Accordingly, mass production of the optical irradiation head can be made. Further, the optical irradiation head can be fabricated in combination with a reproducing head by the same lithography technique, so that it is possible to provide an optical irradiation head and an information recording/reproducing device using this head which can support ultrahigh-density recording at more than subterabits per inch. Further, an optical irradiation head capable of emerging a microscopic optical beam can be mass-produced, and high-density recording can be realized by applying this head to an information recording/reproducing device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical irradiation head comprising:
    a trapezoidal prism having a pair of trapezoidal principal surfaces parallel to each other, a rectangular bottom surface, a rectangular top surface parallel to said rectangular bottom surface, and a pair of oblique side surfaces connecting said rectangular top surface, said rectangular bottom surface, and said trapezoidal principal surfaces, said trapezoidal prism being formed of a first material; and a cover member for covering said trapezoidal principal surfaces and said oblique side surfaces of said trapezoidal prism, said cover member being formed of a second material;

said first and second materials being related so as to satisfy $n_1^2-k_1^2>0$, $k_1<0.01$, and $n_2^2-k_2^2<0$ where $n_1$ and $n_2$ are the refractive indices of said first and second materials, respectively, $k_1$ and $k_2$ are the extinction coefficients of said first and second materials, respectively, and $n_1-j\cdot k_1$ and $n_2-j\cdot k_2 (j^2=-1)$ are the complex indices of refraction of said first and second materials, respectively.

2. An optical irradiation head according to claim 1, further comprising means for making incident on said rectangular bottom surface linearly polarized light having a polarization direction perpendicular to said trapezoidal principal surfaces.

3. An optical irradiation head according to claim 1, wherein said trapezoidal prism is formed of a dielectric transparent to incident light, and said cover member is formed of metal.

4. An optical irradiation head according to claim 2, wherein said rectangular top surface is formed at a position where the electric field intensity of said light incident on said bottom surface is maximized by mode conversion at said oblique side surfaces.

5. An optical irradiation head according to claim 1, wherein said oblique side surfaces are inclined at the same angle to said bottom surface and inclined at the same angle to said top surface.

6. An optical irradiation head according to claim 1, further comprising a dielectric member embedded in said trapezoidal prism so as to extend between said bottom surface and said top surface and be exposed to said top surface at a substantially central portion thereof, said dielectric member having a refractive index smaller than that of said trapezoidal prism, said dielectric member having a polygonal cross section.

7. An optical irradiation head according to claim 1, further comprising a metal member embedded in said trapezoidal prism so as to extend between said bottom surface and said top surface and be exposed to said top surface at a substantially central portion thereof, said metal member having a polygonal cross section.

8. An optical irradiation head according to claim 1, wherein said rectangular top surface has a recess at a substantially central portion thereof.

9. An optical irradiation head according to claim 1, further comprising a triangular prism formed integrally with said trapezoidal prism from said first material, said triangular prism having a triangular principal surface parallel to said trapezoidal principal surfaces of said trapezoidal prism, a bottom surface flush with said rectangular bottom surface of said trapezoidal prism, and a pair of oblique side surfaces;

said cover member further covering said triangular principal surface and said oblique side surfaces of said triangular prism.

10. An optical irradiation head according to claim 1, wherein said cover member has a cutaway portion for partially exposing one of said trapezoidal principal surfaces of said trapezoidal prism;

said optical irradiation head further comprising a grating formed on said exposed trapezoidal principal surface at said cutaway portion.

11. An optical irradiation head according to claim 1, further comprising a magnetic sensor head planarly formed on said cover member.

12. An optical irradiation head comprising:

a trapezoidal prism having a pair of trapezoidal principal surfaces parallel to each other, a rectangular bottom surface, a rectangular top surface parallel to said rectangular bottom surface, and a pair of oblique side surfaces connecting said rectangular top surface, said rectangular bottom surface, and said trapezoidal principal surfaces, said trapezoidal prism being formed of a first material; and a cover member for covering said trapezoidal principal surfaces and said oblique side surfaces of said trapezoidal prism, said cover member being formed of a second material;

said first and second materials being related so as to satisfy $k_1<0.01$ and $|n_1^2-k_1^2|<|n_2^2-k_2^2|$ where $n_1$ and $n_2$ are the refractive indices of said first and second materials, respectively, $k_1$ and $k_2$ are the extinction coefficients of said first and second materials, respectively, and $n_1-j\cdot k_1$ and $n_2-j\cdot k_2 (j^2=-1)$ are the complex indices of refraction of said first and second materials, respectively.

13. An optical irradiation head according to claim 12, further comprising means for making incident on said rectangular bottom surface linearly polarized light having a polarization direction perpendicular to said trapezoidal principal surfaces.

14. An optical irradiation head according to claim 13, wherein said rectangular top surface is formed at a position where the electric field intensity of said light incident on said bottom surface is maximized by mode conversion at said oblique side surfaces.

15. An optical irradiation head according to claim 12, wherein said trapezoidal prism is formed of a transparent dielectric, and said cover member is formed of a material having a relative permittivity greater in absolute value than that of said trapezoidal prism.

16. An optical irradiation head according to claim 15, wherein said trapezoidal prism is formed of diamond, and said cover member is formed of Si.

17. An optical irradiation head according to claim 12, wherein said oblique side surfaces are inclined at the same angle to said bottom surface and inclined at the same angle to said top surface.

18. An optical irradiation head according to claim 12, further comprising a dielectric member embedded in said trapezoidal prism so as to extend between said bottom surface and said top surface and be exposed to said top surface at a substantially central portion thereof, said dielectric member having a refractive index smaller than that of said trapezoidal prism, said dielectric member having a polygonal cross section.

19. An optical irradiation head according to claim 12, further comprising a metal member embedded in said trapezoidal prism so as to extend between said bottom surface and said top surface and be exposed to said top surface at a substantially central portion thereof, said metal member having a polygonal cross section.

20. An optical irradiation head according to claim 12, wherein said rectangular top surface has a recess at a substantially central portion thereof.

21. An optical irradiation head according to claim 12, further comprising a triangular prism formed integrally with said trapezoidal prism from said first material, said triangular prism having a triangular principal surface parallel to said trapezoidal principal surfaces of said trapezoidal prism, a bottom surface flush with said rectangular bottom surface of said trapezoidal prism, and a pair of oblique side surfaces;

said cover member further covering said triangular principal surface and said oblique side surfaces of said triangular prism.

22. An optical irradiation head according to claim 12, wherein said cover member has a cutaway portion for partially exposing one of said trapezoidal principal surfaces of said trapezoidal prism;

said optical irradiation head further comprising a grating formed on said exposed trapezoidal principal surface at said cutaway portion.

23. An optical irradiation head according to claim 12, further comprising a magnetic sensor head planarly formed on said cover member.

24. An information recording/reproducing device for recording/reproducing information to/from a recording medium, comprising:

a light source for emitting an optical beam; and an optical irradiation head for directing light based on said optical beam onto said recording medium;

said optical irradiation head comprising:

a trapezoidal prism having a pair of trapezoidal principal surfaces parallel to each other, a rectangular bottom surface, a rectangular top surface parallel to said rectangular bottom surface, and a pair of oblique side surfaces connecting said rectangular top surface, said rectangular bottom surface, and said trapezoidal principal surfaces, said trapezoidal prism being formed of a first material; and a cover member for covering said trapezoidal principal surfaces and said oblique side surfaces of said trapezoidal prism, said cover member being formed of a second material;

said first and second materials being related so as to satisfy $n_1^2-k_1^2>0$, $k_1<0.01$, and $n_2^2-k_2^2<0$ where $n_1$ and $n_2$ are the refractive indices of said first and second materials, respectively, k1 and k2 are the extinction coefficients of said first and second materials, respectively, and $n_1-j \cdot k_1$ and $n_2-j \cdot k_2 (j^2=-1)$ are the complex indices of refraction of said first and second materials, respectively.

25. An information recording/reproducing device for recording/reproducing information to/from a recording medium, comprising:

a light source for emitting an optical beam; and an optical irradiation head for directing light based on said optical beam onto said recording medium;

said optical irradiation head comprising:

a trapezoidal prism having a pair of trapezoidal principal surfaces parallel to each other, a rectangular bottom surface, a rectangular top surface parallel to said rectangular bottom surface, and a pair of oblique side surfaces connecting said rectangular top surface, said rectangular bottom surface, and said trapezoidal principal surfaces, said trapezoidal prism being formed of a first material; and a cover member for covering said trapezoidal principal surfaces and said oblique side surfaces of said trapezoidal prism, said cover member being formed of a second material;

said first and second materials being related so as to satisfy $k_1<0.01$ and $|n_1^2-k_1^2|<|n_2^2-k_2^2|$ where $n_1$ and $n_2$ are the refractive indices of said first and second materials, respectively, $k_1$ and $k_2$ are the extinction coefficients of said first and second materials, respectively, and $n_1-j \cdot k_1$ and $n_2-j \cdot k_2 (j^2=-1)$ are the complex indices of refraction of said first and second materials, respectively.

* * * * *